United States Patent
Horst

(10) Patent No.: US 10,744,563 B2
(45) Date of Patent: Aug. 18, 2020

(54) 3D PRINTING OF AN OBJECT FROM POWDERED MATERIAL USING PRESSURE WAVES

(71) Applicant: THE BOEING COMPANY, Chicago, IL (US)

(72) Inventor: Perry T. Horst, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 397 days.

(21) Appl. No.: 15/295,866

(22) Filed: Oct. 17, 2016

(65) Prior Publication Data
US 2018/0104743 A1    Apr. 19, 2018

(51) Int. Cl.
| | |
|---|---|
| B22F 3/105 | (2006.01) |
| B33Y 10/00 | (2015.01) |
| B33Y 30/00 | (2015.01) |
| B33Y 50/02 | (2015.01) |
| B29C 64/153 | (2017.01) |
| B29C 64/386 | (2017.01) |
| C22C 47/14 | (2006.01) |

(52) U.S. Cl.
CPC .......... *B22F 3/1055* (2013.01); *B29C 64/153* (2017.08); *B29C 64/386* (2017.08); *B33Y 10/00* (2014.12); *B33Y 30/00* (2014.12); *B33Y 50/02* (2014.12); *B22F 2003/1057* (2013.01); *B22F 2999/00* (2013.01); *C22C 47/14* (2013.01); *Y02P 10/295* (2015.11)

(58) Field of Classification Search
CPC ............ B22F 3/1055; B22F 2003/1057; B22F 2999/00; B33Y 10/00; B33Y 30/00; B33Y 50/02; B29C 64/153; B29C 64/386; Y02P 10/295; C22C 47/14
See application file for complete search history.

(56) References Cited

U.S. PATENT DOCUMENTS

| | | | | |
|---|---|---|---|---|
| 5,182,170 A | * | 1/1993 | Marcus | ................... B22F 3/004 |
| | | | | 156/272.8 |
| 2004/0033881 A1 | | 2/2004 | Heng et al. | |
| 2004/0033882 A1 | | 2/2004 | Barney et al. | |
| 2005/0278933 A1 | | 12/2005 | Macke et al. | |
| 2005/0280189 A1 | | 12/2005 | Macke et al. | |
| 2005/0285314 A1 | | 12/2005 | Macke et al. | |

(Continued)

OTHER PUBLICATIONS

Bukaemskii, A. A., and E. N. Fedorova. 'Explosive compaction and low-temperature sintering of alumina nanopowders'; Combustion, Explosion, and Shock Waves, Nov. 2008.

(Continued)

*Primary Examiner* — Kevin E Yoon
*Assistant Examiner* — Ryan L Heckman
(74) *Attorney, Agent, or Firm* — Moore IP Law

(57) ABSTRACT

A system includes a chamber to receive a powdered material to be used to form an object. The system includes actuators coupled to the chamber. The actuators apply pressure waves to the powdered material in the chamber. The system also includes a controller to activate a plurality of the actuators in a sequence. Activation of the plurality of actuators in the sequence converges pressure waves on a particular volume of powdered material in the chamber to compress the particular volume and to transform at least a portion of the powdered material in the particular volume to solid material of the object.

20 Claims, 5 Drawing Sheets

(56) References Cited

U.S. PATENT DOCUMENTS

| | | |
|---|---|---|
| 2005/0287031 A1 | 12/2005 | Macke et al. |
| 2009/0208361 A1 | 8/2009 | Low et al. |
| 2009/0255912 A1 | 10/2009 | Dietrich |
| 2011/0031432 A1 | 2/2011 | Strasik |
| 2011/0123383 A1* | 5/2011 | Fuwa .................. B22F 3/1055 419/11 |
| 2011/0286874 A1 | 11/2011 | Low et al. |
| 2014/0326304 A1 | 11/2014 | Zhang |
| 2015/0333250 A1 | 11/2015 | Duce et al. |
| 2016/0107235 A1 | 4/2016 | Wilkinson |
| 2016/0207263 A1* | 7/2016 | Gordon .................. B33Y 30/00 |
| 2016/0271875 A1* | 9/2016 | Brown, Jr. ............ B29C 64/386 |
| 2017/0297097 A1* | 10/2017 | Gibson .................. B33Y 30/00 |

OTHER PUBLICATIONS http://tttmetalpowder.com/development-powder-material-explosive-sintering-technology/, 'Development of powder material explosive sintering technology'; Sep. 16, 2014; Tritrust Industrial (China) Co., Ltd.

B. K. Datta, 'Powder Metallurgy: An Advanced Technique of Processing Engineering Materials'; May 30, 2014.

P. A. Molian, 'Three-Dimensional Printing of Nanoscale Powders Using Laser Shockwaves';http://micronanomanufacturing.asmedigitalcollection.asme.org/article.aspx?articleid=2432583; J. Micro Nano-Manuf 3(4), 041006; Sep. 22, 2015.

Piezo Linear Stack Actuators, High Force, Fast Response, High Stability, Physik Instrumente GmbH & Co. KG, <www.linear-actuator.net/datasheets/Linear-Actuator-Piezo-Stack.pdf> retrieved Mar. 19, 2019, 12 pgs.

Pickelmann, L., "High power piezoelectric axial shockwave generation", Piezomechanik, GmbH <https://scilab.co.jp/product/mems/download/piezo_catalog_120930_7.pdf> retrieved Mar. 19, 2019, pp. 1-23.

* cited by examiner

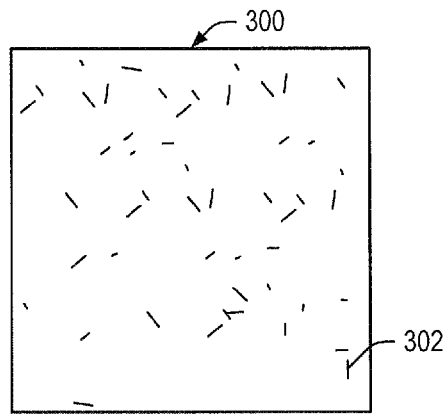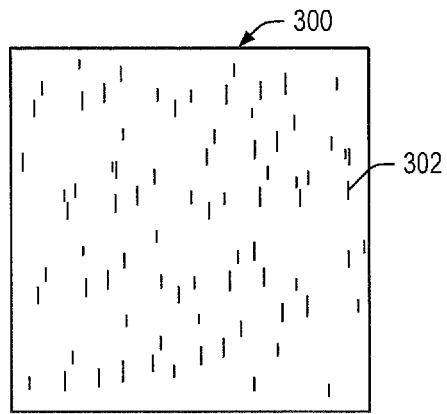
FIG. 3  FIG. 4
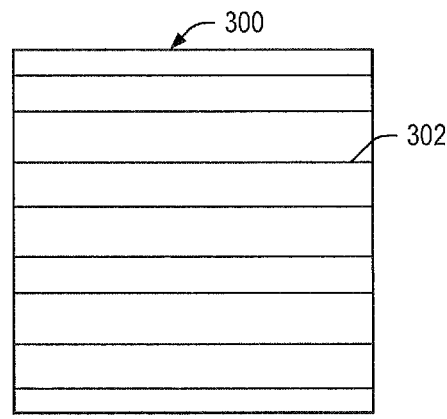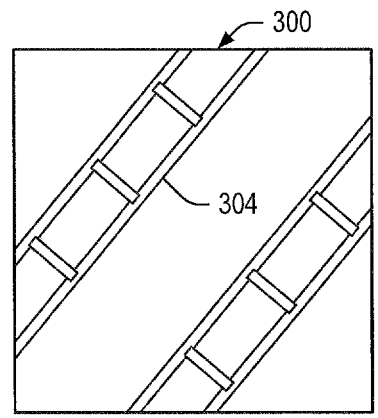
FIG. 5  FIG. 6

… … …

3D PRINTING OF AN OBJECT FROM POWDERED MATERIAL USING PRESSURE WAVES

FIELD OF THE DISCLOSURE

The present disclosure relates to three-dimensional (3D) printing of an object from powdered material using pressure waves.

BACKGROUND

Three-dimensional printing refers to various processes used to form three-dimensional (3D) objects. During use of a typical 3D printer, layers of material are formed based on a model of the object using computer control to produce the object. The 3D printer generally has a moving platform, one or more sweep arms with moving print heads, or rapidly scanning mirrors to steer laser energy.

SUMMARY

According to an embodiment, a system includes a chamber to receive a powdered material to be used to form an object. The system includes actuators coupled to the chamber. The actuators apply pressure waves to the powdered material in the chamber. The system also includes a controller configured to activate a plurality of the actuators in a sequence. Activation of the plurality of actuators in the sequence converges pressure waves on a particular volume of the powdered material in the chamber to compress the particular volume and to transform at least a portion of the powdered material in the particular volume to solid material corresponding to a portion of the object.

According to an embodiment, a method includes activating a first actuator to transmit a first pressure wave into a powdered material in a chamber. The method also includes activating a second actuator to transmit a second pressure wave into the powdered material in the chamber. The second actuator is actuated at a time configured to cause the second pressure wave to converge with the first pressure wave at a particular volume and to transform at least a portion of the powdered material in the particular volume to a solid material.

According to an embodiment, a method includes placing powdered material in a chamber. The method also includes implementing, via a controller coupled to actuators, an activation sequence of the actuators to transmit pressure waves into the powdered material in the chamber and to build an object in the chamber by transforming portions of the powdered material to solid material by convergence of a plurality of the pressure waves on particular volumes of the powdered material.

The features, functions, and advantages described herein can be achieved independently in various embodiments or may be combined in yet other embodiments, further details of which are disclosed with reference to the following description and drawings.

BRIEF DESCRIPTION OF THE DRAWINGS

FIG. 3 is a cross-sectional view of a portion of a first embodiment of an object formed using the 3D printing system of FIG. 1, where the object includes material randomly distributed and randomly oriented in the object.

FIG. 4 is a cross-sectional view of a portion of a second embodiment of an object formed using the 3D printing system of FIG. 1, where the object includes material randomly distributed in the object with a fixed orientation of the material.

FIG. 5 is a cross-sectional view of a portion of a third embodiment of an object formed using the 3D printing system of FIG. 1, where the object includes material distributed and oriented in the object in a pattern.

FIG. 6 is a sectional view of a portion of a fourth embodiment of an object formed using the 3D printing system of FIG. 1, where the object includes a skeletal frameworks of strengthening members, electrical interconnects, or both.

DETAILED DESCRIPTION

Figure 1:
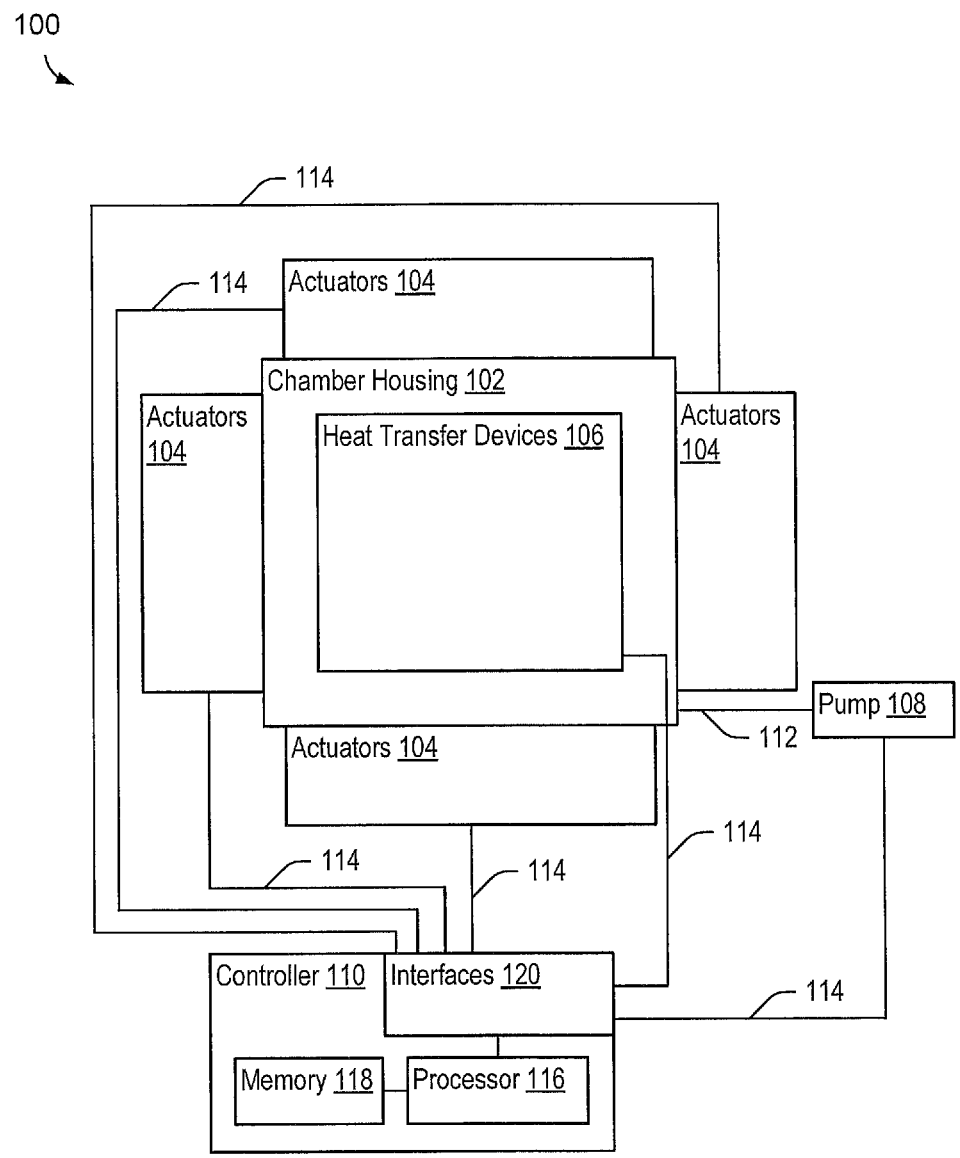
FIG. 1 is a block diagram of an embodiment of a 3D printing system to build a solid object in a chamber from powdered material using pressure waves.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The present disclosure relates to 3D printing of an object from powdered material using pressure waves. In an embodiment, powdered material is compressed in a chamber of a 3D printer. Compressing the powdered material may facilitate propagation of pressure waves through the powdered material. Actuators are activated in a sequence to transmit pressure waves into the powdered material. Activation of the actuators may be timed to create common wave fronts with greater energy than wave fronts created by a single actuator. The sequence enables constructive interference and destructive interference of pressure waves so that pressure waves converge on particular volumes. Convergence of the pressure waves on a particular volume for a period of time may cause compression, heating, or both, of the particular volume so that at least a portion of the powdered material in the particular volume transforms (e.g., reacts, fuses, sinters, etc.) to solid material. The sequence also adjusts a position of one or more convergence regions so that the object is built from the powdered material and so that heat caused by transformation of the powdered material to solid material is allowed to dissipate to adjacent regions without causing transformation of powdered material in the adjacent regions to solid material. Build time for the object may be a function of size of the object, efficiency of the powdered material in propagating the pressure waves, energy required to transform the powdered material to solid material, power and frequency capability of the actuators, number of convergence regions that can be simultaneously maintained using the actuators, and other factors.

The 3D printer enables building of objects from a plurality of materials (e.g., metals, ceramics, polymers, etc.). The 3D printer is gravity neutral and will function in weightlessness or low gravity environments (e.g., onboard an orbital platform). Also, the 3D printer is reliable since the 3D printer does not utilize moving platforms or sweep arms with printer heads during the build of the object. Failure of one or more actuators of the 3D printer can be accommodated during a build by adjustment of the sequence to accommodate the one or more failed actuators. The sequence of activation of the actuators may inhibit build up of residual stresses in the object that are observed in objects made using layer-by-layer laser sintering. Also, the sequence may inhibit undesired heat transfer during the build of the object by changing convergence locations for the pressure waves during the build.

FIG. 1 is a block diagram that illustrates a particular embodiment of a 3D printing system 100 to build a solid object in a chamber from powdered material using pressure waves. The 3D printing system 100 may include a chamber housing 102, actuators 104, heat transfer devices 106, a pump 108, and a controller 110.

The chamber housing 102 may be formed of metal, ceramics, or combinations thereof. The chamber housing 102 may include a chamber or cavity where the object is formed from powdered material placed in the chamber. The chamber may have a rectangular prism, cubic, spherical, cylindrical, or other geometric shape. The chamber may include one or more movable walls that are movable to enable the chamber to be opened. The one or more movable walls may be coupled to a hydraulic system, mechanical system, or both to close the chamber. Walls of the chamber housing 102 may compress powdered material in the chamber. Compression of the powdered material may facilitate travel of pressure waves caused by the actuators 104 into the powdered material.

The actuators 104 may be coupled to at least one wall of the chamber housing 102 and to the controller 110. In an embodiment, the actuators 104 are located on multiple walls of the chamber housing 102. For example, the actuators 104 may be located on all six walls of the chamber housing 102 defining a cuboid chamber to enable the object to be built from a center outwards in six directions simultaneously. For some powdered materials, convergence of pressure waves from actuators 104 coupled to different walls of the chamber housing 102 may be used to provide conditions that enable transition of the powdered material to solid material.

When an actuator of the actuators 104 is activated, an impact end of the actuator may contact compressed powdered material in the chamber of the chamber housing 102 or may contact a chamber wall to transmit a pressure wave into powdered material in the chamber of the chamber housing 102. In some embodiments, the actuators 104 may include or correspond to arrays of piezoelectric actuators (e.g., piezoelectric stack devices) or other types of actuators. The number of actuators 104 in an array of actuators 104 may be chosen so that the array is capable of delivery of a particular amount of impulse force to particular convergence volumes in the chamber, so that the array is capable of delivery of a particular amount of sustained force to particular volumes, or both. Arrays of actuators 104 may include from four to thousands of individual actuators depending to size of the chamber housing, capabilities of the actuators, build resolution, maximum build rate, other factors, or combinations thereof.

Multiple arrays of the actuators 104 may be coupled to one or more walls of the chamber housing 102. The multiple arrays may reduce build time needed to produce the object by enabling use of multiple convergence regions for pressure waves so that a plurality of portions of the object are built in parallel.

For each actuator of the actuators 104, timing of actuation relative to other actuators, frequency of actuation, and actuation power may be controlled by the controller 110 to converge pressure waves on particular volumes within the chamber of the chamber housing 102. Convergence may be obtained by constructive interference and destructive interference of pressure waves generated by the actuators 104. For example, the controller 110 may use beam forming techniques to control timing and magnitude of force generated by each actuator to converge pressure waves to a particular region. In some embodiments, beams from different directions may intersect and constructively interfere at a volume of the powdered material to be solidified (e.g., fused, sintered, etc.).

Heat transfer devices 106 may be coupled to the chamber housing 102 and to the controller 110. The heat transfer devices 106 may include or correspond to heaters, cooling devices, or both. The heat transfer devices 106 may be used to heat powdered material in the chamber of the chamber housing 102, cool powdered material in the chamber of the chamber housing 102, cool the actuators, or combinations thereof. In some embodiments, the chamber housing 102 may include passageways for circulation of heat transfer fluid. In some embodiments, the chamber housing 102 may be placed in a heat transfer fluid (e.g., a heat transfer liquid or a heat transfer gas), and a temperature of the heat transfer fluid may be controlled to control temperatures within the chamber. In some embodiments, resistance heaters may be coupled to the chamber housing 102 and control of electricity applied to the resistance heaters may control heating of the chamber housing 102 and material in the chamber. In other embodiments, other types of heat transfer devices may be used to control heating and cooling of the actuators 104, the chamber housing 102, and material in the chamber of the chamber housing 102.

The pump 108 may be coupled to the chamber housing 102 and to the controller 110. After the chamber of the chamber housing 102 is filled with powdered material and closed, the controller 110 may activate the pump 108 to evacuate gas (e.g., air) from the chamber via a vacuum line 112. The pump 108 may also be used continuously or periodically during build of the object in the chamber. Removal of the gas may inhibit oxidation of the powdered material, may inhibit oxidation of solid material formed from the powdered material, may inhibit formation of bubbles in the object, or combinations thereof. In some embodiments, an inert gas (e.g., helium) may be added to the chamber before building the object in the chamber. In some embodiments, the pump 108 may draw inert gas through the chamber during build of the object. Drawing the inert gas through the chamber may facilitate removal of other gases in the chamber, may facilitate heat transfer to or from the chamber, or both.

The controller 110 may be coupled to the actuators 104, the heat transfer devices 106, the pump 108, and other systems (e.g., an opening and closing system for the chamber housing, temperature sensors that are used by the controller 110 to determine which heat transfer devices 106 to activate or deactivate, etc.) by one or more control lines 116. The controller 110 may control operations of the actuators 104, the heat transfer devices 106, the pump 108, and the other systems via received and transmitted signals.

The controller 110 may include one or more processors 116, one or more memories 118, and one or more interfaces 120. The one or more memories 118 may include instructions executable by the one or more processors 116 to perform operations. The operations may include, but are not limited to, determining an activation sequence of the actuators 104 to produce the object in the chamber of the chamber housing 102, implementing the activation sequence, determining utilization of heat control devices 106, implementing usage of the heat control devices 106, controlling the pump 108, and opening and closing the chamber housing 102.

The interfaces 120 may enable interaction with users, other devices, or both. The interaction may be performed via a keyboard, via connections to one or more computer systems to receive models of objects to be formed from the powdered material, via display of data and information on one or more display devices or indicators, via a touch screen, via one or more switches, via other input or output devices, or combinations thereof. The interfaces 120 may enable the controller to receive input from sensors coupled to the chamber housing 102 (e.g., temperature sensors and pressure sensors), may enable the controller to control the actuators 104, the heat control devices 106, the pump 108, or combinations thereof via the one or more control lines 112, may enable transfer of data regarding printing of a particular object to a computer system, or combinations thereof.

To use the 3D printing system 100, a 3D model of the object to be built by the 3D printing system 100 may be provided to the controller 110. The 3D model may include a mathematical model of the object, a computer-aided design (CAD) representation of the object, a numerical programming language representation (G-code) of the object, other representations of the object, or combinations thereof. The controller 110 may use the 3D model of the object to determine an activation sequence of the actuators 104 that results in formation of the object from powdered material in the chamber of the chamber housing 102. In some embodiments, the controller 110 may receive the activation sequence from a computer system instead of determining the activation sequence from a 3D model of the object. The controller 110 may also determine or receive data corresponding to an estimated usage sequence of the one or more heat transfer devices 106 needed to produce the object.

The chamber housing 102 may be opened. Opening the chamber housing 102 may be a manual operation, may be controlled by the controller 110, or both. While the chamber is open, powdered material may be placed in the chamber of the chamber housing 102. The powdered material may include metal, polymer, glass, wax, semiconductor material, silicon carbide, material to produce a ceramic, material to produce one or more polymers (e.g., monomers, catalyst, or both), ceramics, electrical interconnects, strengthening members (e.g., wire, carbon fibers, carbon nanotubes, etc.), dyes, fillers, other material, or combinations thereof.

In some embodiments, the powdered material may be poured into the chamber. Some of the actuators 104 coupled to the chamber housing 102 may be activated (e.g., at low power, at random, or both) to vibrate the powdered material as the powder is introduced into the chamber. Activation of some of the actuators may facilitate packing the powdered material in the chamber and reduce or eliminate presence of void spaces in the powdered material. In other embodiments a blank of the powdered material may be placed in the chamber. The blank may be formed by compressing the powdered material in a press to form a consolidated block of the powdered material. In some embodiments, a binder may be added to the powdered material to maintain the blank in a desired shape. When the powdered material is formed into a blank, the blank can be formed as layers of different materials so that the object produced from the blank will have specific materials and specific properties at particular locations of the object.

In an embodiment, the housing chamber 102 may be closed (e.g., two chamber housing portions with hemispherical cavities may be locked together to form a spherical chamber). Powdered material may be introduced into the chamber via one or more openings (e.g., one or more orifices through a wall of the chamber housing 102) using one or more pumps (e.g., one or more augers, one or more positive displacement pumps, or combinations thereof). When the chamber is initially filled, additional powdered material or other material may be forced into the chamber via at least one opening to provide compression to the powder in the chamber. The area of the at least one opening may be small as compared to a size of a wall of the chamber and may result in application of less force to compress the powdered material than would be used to compress the powdered material using a wall of the chamber housing 102.

After placing the powdered material in the chamber, the chamber housing 102 may be closed. Closing the chamber housing 102 may be a manual operation, an operation controlled by the controller 110, or a combination thereof. Closing the chamber housing 102 may compress the powdered material or press fit the blank into the chamber. Closing the chamber housing 102 may compress the powdered material and cause contact of the powdered material with walls of the chamber, impact ends of the actuators 104, or both, in order to enable propagation of pressure waves generated by the actuators 104 into the powdered material.

When the chamber is closed, the controller 110 may implement the estimated usage sequence of the one or more heat transfer devices 106. During use of the 3D printing system 100, the estimated usage sequence of the one or more heat transfer devices 106 may be modified based on sensor data received from sensors coupled to the 3D printing system 100. Implementing the usage sequence of the one or more heat transfer devices may establish an acceptable temperature profile in the powdered material in the chamber before start of the activation sequence of the actuators 104. In some embodiments, the one or more heating devices 106 may heat the chamber housing 102 to raise temperatures of some of the powdered material in one or more particular volumes in the chamber near to a transition temperature of the powdered material that results in solid material upon compression by converging pressure waves (e.g., within 1 degree Centigrade of a transition temperature, within 5 degrees Centigrade of the transition temperature, within 10 degrees Centigrade of the transition temperature, or within some other number of degrees Centigrade of the transition temperature). Converging pressure waves on the one or more particular volumes may cause portions of the powdered material in the one or more particular volumes to react, to fuse, to sinter, to aggregate, or combinations thereof, and form solid material.

The controller 110 may implement the activation sequence of actuators 104 after use of the one or more heat transfer devices 106 establish an acceptable temperature profile in the powdered material. For a particular actuator of the actuators 104, the activation sequence may control power of actuation, frequency of actuation, and timing of actuation relative to other actuators so that constructive interference and destructive interference of pressure waves generated by the actuators 104 converges pressure waves on one or more particular volumes of powdered material in the chamber. Converging pressure waves on a particular volume may compress the particular volume, heat the particular volume, or both. Converging pressure waves on the one or more particular volumes may cause portions of the powdered material in the one or more particular volumes to react, to fuse, to sinter, to aggregate, or combinations thereof, and form solid material. The activation sequence may change locations of the volumes of powdered material subjected to converging pressure waves during build of the object. Portions of the object being built at a particular time may be selected to facilitate acceptable heat transfer within the chamber of the chamber housing 102 near an interface between the powdered material and solid material formed from the powdered material and may be selected to limit residual stress formation in the object.

After the activation sequence of the actuators 104 is complete (e.g., the build of the object is complete), the one or more heat transfer devices may be used to remove heat from the 3D printing system 100, the chamber may be opened, and the object may be removed from the chamber. Excess powdered material may be recovered and used in subsequent uses of the 3D printing system 100. The object may be subjected to further processing to produce a final product.

Figure 2:
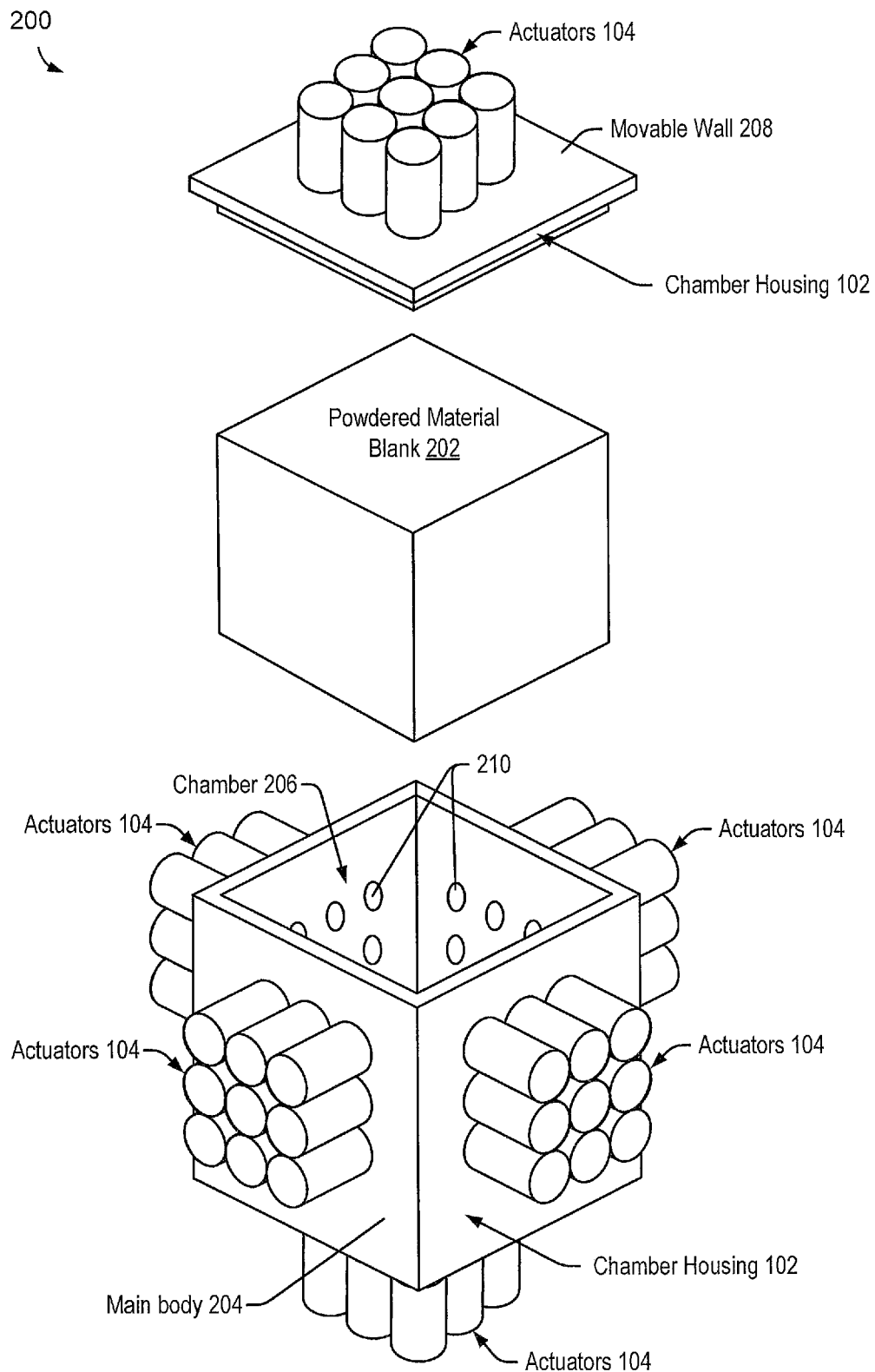
FIG. 2 is a representation of a chamber housing, powdered material blank, and actuators of a particular implementation of the 3D printing system of FIG. 1.

FIG. 2 is a diagram that illustrates a particular embodiment of a system 200 including the chamber housing 102, a powdered material blank 202, and actuators 104 for building a solid object from the powdered material blank 202 using pressure waves. The chamber housing 102 may include a main body 204, chamber 206, and a movable wall 208. In the example illustrated in FIG. 2, the actuators 104 may be coupled to each wall of the main body 204 and the movable wall 208. The powdered material blank 202 may be sized to be press fit into the chamber 206 by the movable wall 208 when the chamber 206 is closed. The movable wall 208 may be moved by a hydraulic system or other movement system to close the chamber 206.

When the powdered material blank 202 is in the chamber 206 and the movable wall 208 is secured to the main body 204, impact ends 210 of the actuators 104 may contact the powdered material blank 202. Activation of the actuators 104 may cause pressure waves to be transmitted into the powdered material blank 202. Timing, frequency, and power of actuation of the actuators 104 may be controlled (e.g., using beamforming or other wave propagation techniques) by a controller to converge pressure waves on particular volumes of the powdered material blank 204 during an activation sequence of the actuators 104 to convert powdered material to solid material and form the solid object. Although nine actuators 104 per side of the chamber 106 are depicted in FIG. 2, other embodiments may include fewer or more actuators 104 per side, and one or more sides may not include any actuators 104.

Referring to FIGS. 3-6, cross-sectional views of portions of embodiments of portions of objects 300 formed using the 3D printing system of FIG. 1 are depicted. In a first embodiment depicted in FIG. 3, the object 300 includes material 302 randomly distributed and randomly oriented throughout the object 300. The material 302 may include strengthening members, fillers, or combinations thereof. In a second embodiment depicted in FIG. 4, the object 300 includes the material 302 randomly distributed throughout the object 300 with a fixed orientation. The orientation may be established or controlled using a matrix material (e.g., the powdered material), a magnetic field, or both, during fabrication of the powdered material blank 202 of FIG. 2. In a third embodiment depicted in FIG. 5, the object 300 includes the material 302 distributed throughout the object 300 in a particular pattern and orientation. The material 302 may include fiber strands, metal strands, plies, mats, or combinations thereof. In a fourth embodiment depicted in FIG. 6, the object 300 includes structures 304. The structures 304 may include skeletal frameworks of strengthening members, electrical interconnects, or both, arranged during fabrication of the powdered material blank 202 of FIG. 2. In other embodiments, the object may include only solid material formed from powdered material, or may include other types of materials in the object than are depicted in FIGS. 3-6.

Figure 7:
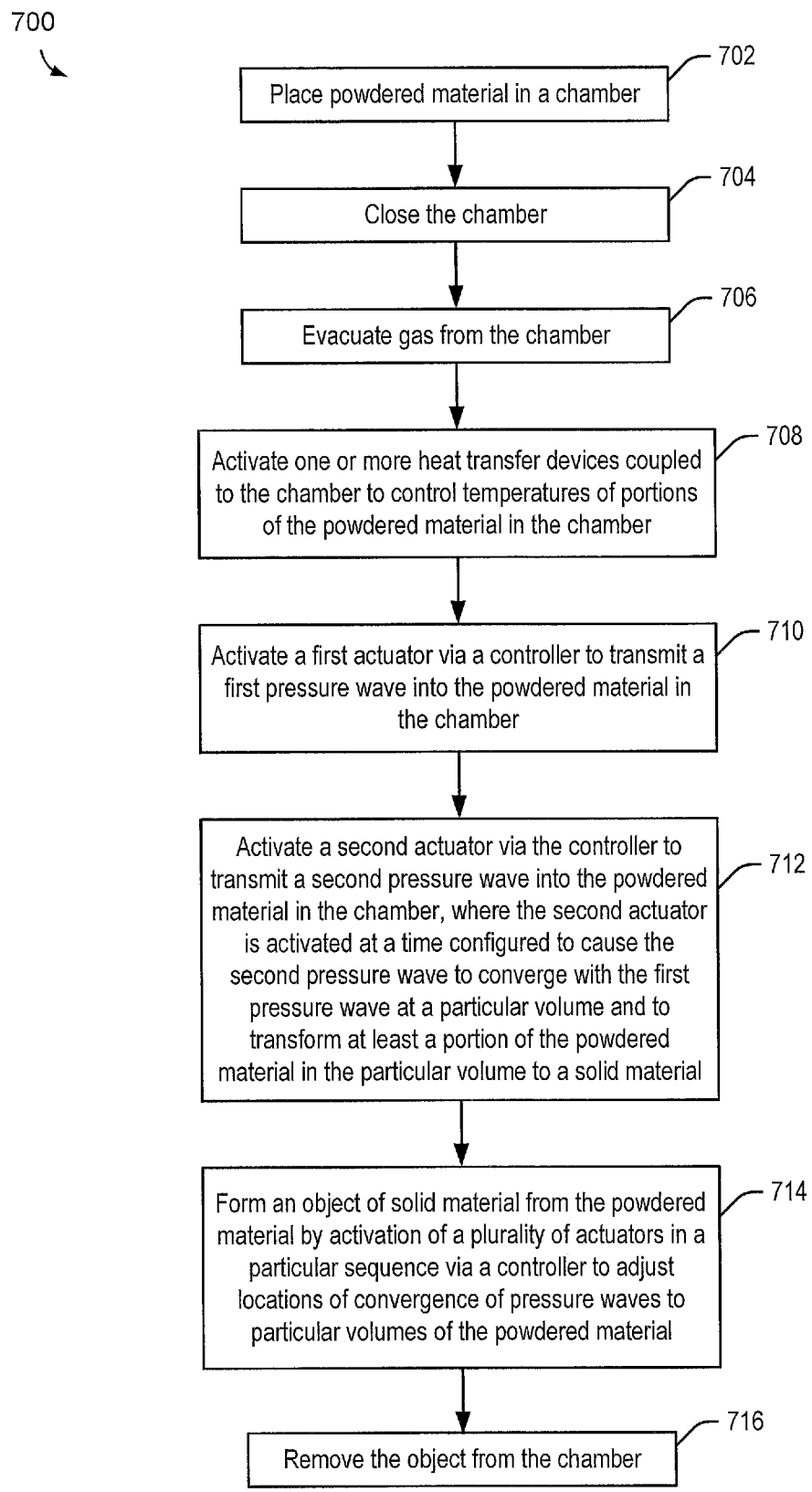
FIG. 7 is a flow chart of a first embodiment of a method of 3D printing a solid object in a chamber from powdered material using pressure waves.

Referring to FIG. 7, a first embodiment of a method of building an object using pressure waves is shown and generally designated 700. The method 700 may be performed by the system 100 depicted in FIG. 1. A controller may receive a model of the object to be built in the chamber. When the controller receives the model, the controller may determine an activation sequence of actuators to build the object in the chamber and a heat control sequence to build the object. The heat control sequence may include activating one or more heat control devices at particular times, deactivating the one or more heat control devices at particular times, or both. The heat control devices may include one or more heaters, one or more cooling devices, or combinations thereof. In some embodiments, the controller may receive the activation sequence for the actuators and the heat control sequence instead of the model.

The method 700 may include placing powdered material in a chamber, at 702. In some embodiments, the powdered material may be poured in the chamber. In other embodiments, the powdered material may be a blank of compressed powdered material that is placed in the chamber. The powdered material may include a composite or a mixture of multiple distinct materials, which may include one or more metals, one or more ceramics, one or more polymers, reinforcing fibers, coloring agents, other materials, or combinations thereof.

The chamber may be closed, at 704. Closing the chamber may compress powdered material in the chamber or press fit the blank into the chamber. The powdered material may be in contact with walls of the chamber, with impact ends of actuators, or both to enable pressure waves generated by the actuators to be transmitted into the powdered material. In some embodiments, a vacuum system (e.g., a pump) may be engaged to evacuate gas (e.g., air) from the chamber, at 706.

After the chamber is closed, the controller may activate one or more heat transfer devices coupled to the chamber to control temperatures of portions of the powdered material in the chamber, at 708. Activating the one or more heat transfer devices may include implementing the heat control sequence.

The controller may implement the activation sequence of the actuators. Implementing the activation sequence of the actuators may include activating a first actuator to transmit a first pressure wave into the powdered material in the chamber, at 710. Implementing the activation sequence of the actuators may also include activating a second actuator to transmit a second pressure wave into the powdered material in the chamber, at 712. The second actuator is activated at a time configured to cause the second pressure wave to converge with the first pressure wave at a particular volume and transform at least a portion of the powdered material in the particular volume to a solid material. Constructive interference and destructive interference of pressure waves generated by the actuators for particular periods of time may result in convergence of the pressure waves on particular volumes in order to convert the powdered material to solid material to build the object. The vacuum system may be continuously or periodically activated during the activation sequence to remove gas from the chamber. Removing gas from the chamber before the sequence, during the activation sequence, or both, may inhibit unwanted oxidation reactions in the chamber and may inhibit formation of voids in the object due to gas bubbles.

The method 700 may include forming an object of solid material from the powdered material by activation of a plurality of actuators in a particular sequence via a controller, at 714. Activation of the plurality of actuators in the particular sequence may adjust target locations (e.g., locations of convergence of pressure waves) to particular volumes of the powdered material. Convergence of the pressure waves at the target locations for particular time periods may facilitate transformation of the powdered material to the solid material of the object.

After completion of the activation sequence and the heat control sequence, the chamber may be opened. The object may be removed from the chamber, at 716. Unused powdered material may be recovered and used. The object may be subjected to further processing (e.g., tapping, boring, grinding, polishing, etc.).

Figure 8:
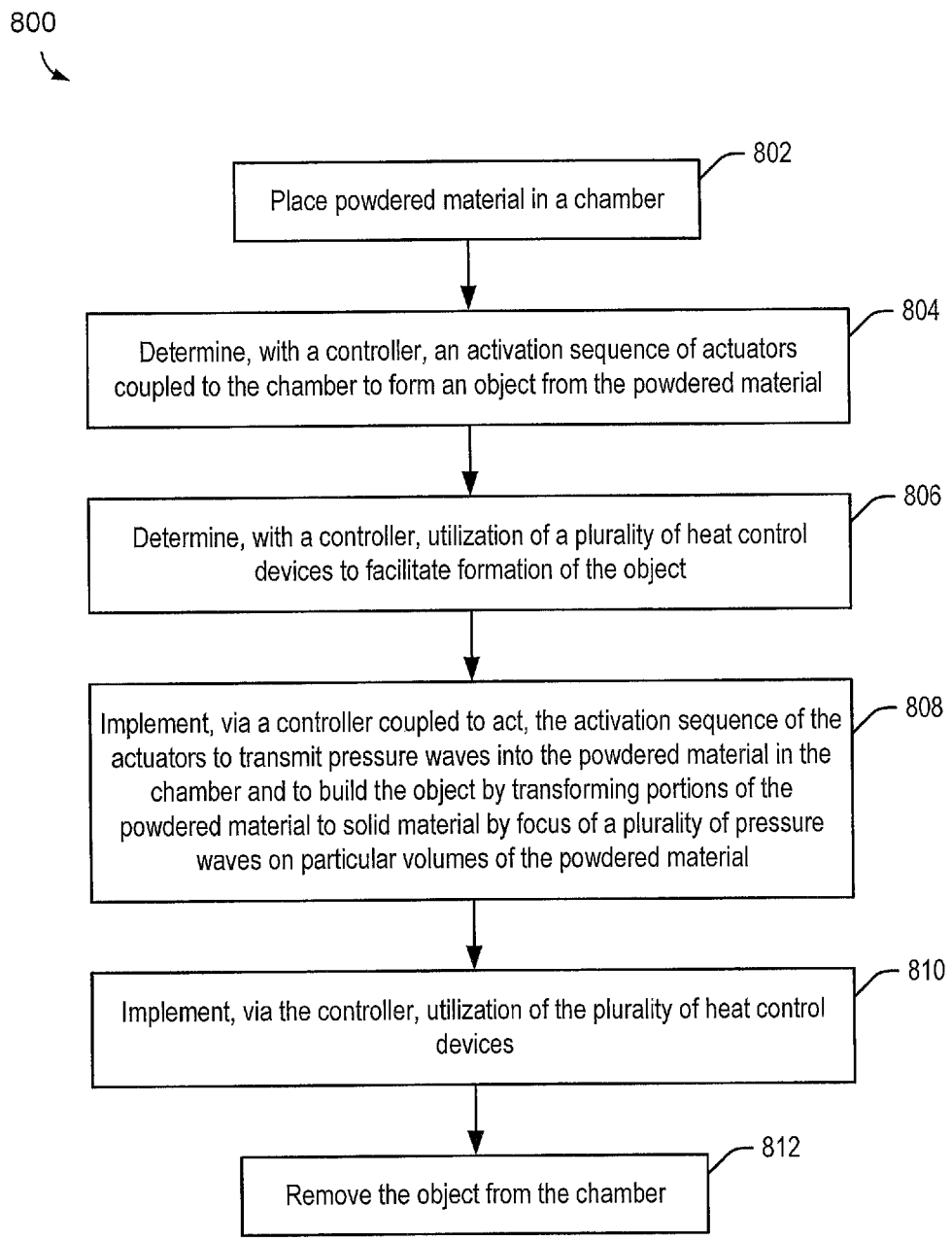
FIG. 8 is a flow chart of a second embodiment of a method of 3D printing a solid object in a chamber from powdered material using pressure waves.

Referring to FIG. 8, a second embodiment of a method of building an object using pressure waves is shown and generally designated 800. The method 800 may be performed by the system 100 depicted in FIG. 1. The method 800 may include placing powdered material in a chamber of a 3D printer, at 802. Placing the powdered material in the chamber may include pouring powdered material in the chamber or placing a blank of powdered material in the chamber. The chamber may be closed. Closing the chamber may compress the powdered material and cause of contact of walls of a chamber housing, contact ends of actuators, or both to contact the powdered material so that pressure waves generated by the actuators will propagate into the powdered material.

A controller may determine an activation sequence of actuators coupled to the chamber, at 804. The activation sequence is configured to form the object from the powdered material. In some embodiments, the controller may determine the activation sequence bases on a 3D model of the object input into the controller via one or more input interfaces. In other embodiments, the controller may not include sufficient processing power to determine the activation sequence. In such embodiments, the controller may receive the activation sequence as input via the one or more input interfaces from a computing device.

The controller may determine utilization of a plurality of heat control devices to facilitate formation of the object, at 806. The utilization may be based on a heat transfer model for material in the chamber and heat generation due to activation of the actuators, heat due to the pressure waves, heat due to transformation of powdered material to solid material, based on received input from temperature sensors, based on models of heat transfer for the plurality of heat transfer devices, or combinations thereof.

The controller may implement the activation sequence of the actuators to build the object, at 808. The object may be built by transforming portions of the powdered material to solid material by convergence of a plurality of pressure waves caused by the activation sequence of the actuators on particular volumes. The activation sequence may control power, activation timing, and activation frequency of the actuators so that constructive interference and destructive interference of pressure waves caused by the actuators converging the pressure waves on the particular volumes.

The controller may implement utilization of the plurality of heat control devices, at 810. Implementation of utilization of the plurality of heat control devices may be performed before implementation the activation sequence of actuators, during implementation of the activation sequence of actuators, and after implementation the activation sequence of actuators.

After implementation of the activation sequence of actuators and implementation of utilization of the plurality of heat control devices, the chamber may be opened. The object may be removed from the chamber, at 812. Excess powdered material may be removed from the object, chamber, or both. The excess powdered material may be Ruined into a new powdered material blank and may be used in a subsequent use of the process 800 to form a solid object. The object may be subjected to further processing to form a final product.

The illustrations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A system comprising:
 a chamber to receive a powdered material to be used to form an object;
 actuators coupled to the chamber; and
 a controller configured to activate a plurality of the actuators in a sequence, wherein each actuator includes an impact end, wherein each actuator is configured to move from a first position to a second position responsive to being activated, wherein the first position corresponds to a corresponding impact end not physically contacting the powdered material, wherein the second position corresponds to a corresponding impact end physically contacting the powdered material, wherein each actuator is configured to move from the second position to the first position responsive to being deactivated, wherein the contact of the impact end applies a pressure wave to the powdered material, and wherein activation of the plurality of the actuators in the sequence converges pressure waves on a particular volume of the powdered material in the chamber to compress the particular volume and to transform one or more portions of the powdered material in the particular volume to solid material corresponding to a portion of the object.

2. The system of claim 1, further comprising heat transfer devices coupled to the chamber.

3. The system of claim 2, wherein, before the controller activates the plurality of the actuators in the sequence, the heat transfer devices are configured to establish a temperature of the one or more portions of the powdered material in the particular volume near to a transition temperature that results in the solid material upon application of converged pressure waves to the particular volume.

4. The system of claim 2, wherein the heat transfer devices comprise one or more heaters.

5. The system of claim 2, wherein the heat transfer devices comprise one or more cooling devices.

6. The system of claim 2, wherein the controller controls use of the heat transfer devices.

7. The system of claim 1, wherein a wall of the chamber is movable to compress powdered material in the chamber.

8. The system of claim 1, wherein the activation of the actuators during the sequence creates common wave fronts with greater energy than wave fronts created by a single actuator.

9. The system of claim 1, further comprising one or more vacuum lines coupled to the chamber to remove first gas from the chamber, add second gas to the chamber, or both.

10. A method comprising:
activating, via a controller, a first actuator to make a first contact of a first impact end of the first actuator with a powdered material in a chamber, wherein the first contact of the first impact end with the powdered material transmits a first pressure wave into the powdered material; and
activating, via the controller, a second actuator to make a second contact of a second impact end of the second actuator with the powdered material in the chamber, wherein the second contact of the second impact end with the powdered material transmits a second pressure wave into the powdered material, and wherein the second actuator is actuated at a time configured to cause the second pressure wave to converge with the first pressure wave at a particular volume and to transform one or more portions of the powdered material in the particular volume to a solid material, wherein the first actuator and the second actuator are configured to move from a first position to a second position responsive to being activated, wherein the first position corresponds to a corresponding impact end not physically contacting the powdered material, wherein the second position corresponds to a corresponding impact end physically contacting the powdered material, and wherein each actuator is configured to move from the second position to the first position responsive to being deactivated.

11. The method of claim 10, further comprising:
placing the powdered material in the chamber; and
compressing the powdered material in the chamber.

12. The method of claim 11, further comprising evacuating gas from the chamber.

13. The method of claim 10, further comprising placing a blank in the chamber, the blank comprising the powdered material.

14. The method of claim 10, further comprising activating one or more heat transfer devices coupled to the chamber to control temperatures of portions of the powdered material, solid material, or both, in the chamber.

15. The method of claim 10, further comprising forming an object of solid material from the powdered material by activation of a plurality of actuators in a particular sequence via a controller to adjust locations of convergence of pressure waves to particular volumes of the powdered material.

16. A system comprising:
a chamber to receive a powdered material to be used to form an object, the chamber formed by two or more chamber walls;
actuators coupled to the chamber walls; and
a controller configured to activate a plurality of the actuators in a sequence, wherein each actuator includes an impact end, wherein each actuator is configured to move from a first position to a second position responsive to being activated, wherein the first position corresponds to a corresponding impact end not physically contacting a chamber wall, wherein the second position corresponds to a corresponding impact end physically contacting the chamber wall, wherein each actuator is configured to move from the second position to the first position responsive to being deactivated, wherein the physical contact of the impact end applies a pressure wave to the powdered material, and wherein activation of the plurality of the actuators in the sequence converges pressure waves on a particular volume of the powdered material in the chamber to compress the particular volume and to transform one or more portions of the powdered material in the particular volume to solid material corresponding to a portion of the object.

17. The system of claim 16, further comprising one or more vacuum lines coupled to the chamber to remove first gas from the chamber.

18. The system of claim 16, further comprising heat transfer devices coupled to the chamber.

19. The system of claim 18, wherein the heat transfer devices comprise one or more heaters.

20. The system of claim 18, wherein the heat transfer devices comprise one or more cooling devices.

* * * * *